Dec. 8, 1953 M. A. SULLIVAN 2,661,845
FILTER
Filed Oct. 13, 1948 2 Sheets-Sheet 1

Inventor
Milton A. Sullivan
By Albin F. Knight
Attorney

Dec. 8, 1953     M. A. SULLIVAN     2,661,845
FILTER
Filed Oct. 13, 1948     2 Sheets-Sheet 2
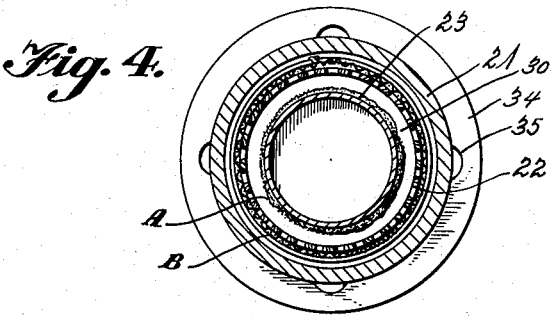
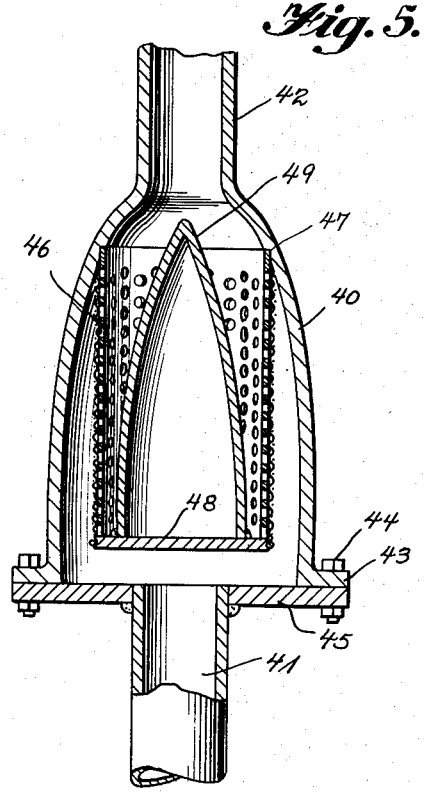
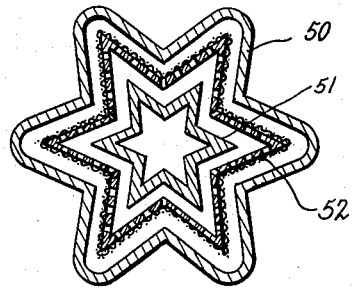
Inventor
Milton A. Sullivan
By Albin F. Knight
Attorney Patented Dec. 8, 1953

2,661,845

UNITED STATES PATENT OFFICE 2,661,845

FILTER

Milton A. Sullivan, Enka, N. C., assignor to American Enka Corporation, Enka, N. C., a corporation of Delaware Application October 13, 1948, Serial No. 54,257

4 Claims. (Cl. 210—164)

This invention relates to the filtering or straining arts and more particularly to a filter or strainer for use in removing impurities from ripened viscose spinning solutions in their passage between the ripening zone and the spinneret.

In the spinning of viscose rayon the viscose solution is matured in storage vats for a period of several days and, when fully ripened, must be spun into rayon thread in the shortest possible time in order to prevent further ripening. Accordingly, a matured batch of viscose is handled on a rigid time schedule and is pumped from the storage vats first to manifolds and then to lines leading to the spinnerets of those machines which it is supplying. Since it is never possible to avoid the presence in the viscose solution of some undissolved particles of cellulose and some foreign matter, it is customary to pass the solution through strainers and candle filters located in the supply line between the manifold and the individual spinneret.

The strainer employed must, of course, afford adequate flow space to avoid restrictions in the line and, for this reason, it has been customary to employ cylindrical screen type strainers of substantial cross section and length and, to accommodate such strainers, it is, of course, necessary to provide housing chambers which are considerably larger than the viscose lines leading to and from the strainer. This arrangement is relatively easy to construct and install and has been found to afford adequate screening surfaces to the flowing viscose. Nevertheless, despite these advantages, the screen assembly has been the source of considerable trouble resulting from the use of housing chambers having such large capacities that the viscose solution did not move through fast enough. The more or less stagnated viscose became over-ripened and as a result tended to stratify, congeal and form skins. This created the production of poor quality rayon yarn and also resulted in spinneret clogging which incurred frequent shutdowns of the machines and involved cleaning the entire system which was conducive to delays and was both costly and impractical.

It has now been found, however, as a part of this invention, that the problem can be entirely overcome by maintaining the flow rate of the viscose in the strainer chamber at substantially the same value as that which prevails in the lines leading to and from that chamber; it is also desirable to pass the viscose through the chamber as quickly as possible.

There has been developed, also as part of this invention, apparatus for maintaining the flow conditions which have been found to be desirable and this apparatus by suitable adjustment is capable of producing varied flow conditions in the vicinity of a strainer and is therefore of broad general utility.

Other objects and advantages of this invention will be apparent upon review of the following detailed description of several embodiments thereof in conjunction with the annexed drawings wherein:

Figure 4 is a view in horizontal section taken along the line 4—4 of Figure 2;

Figure 5 is a somewhat schematic vertical sectional view of a modified type of strainer assembly constructed in accordance with the principles of the present invention; and Figure 6 is a view in horizontal section illustrating another type cross section adapted to be used in constructing a strainer assembly in accordance with the present invention.

Figure 1:
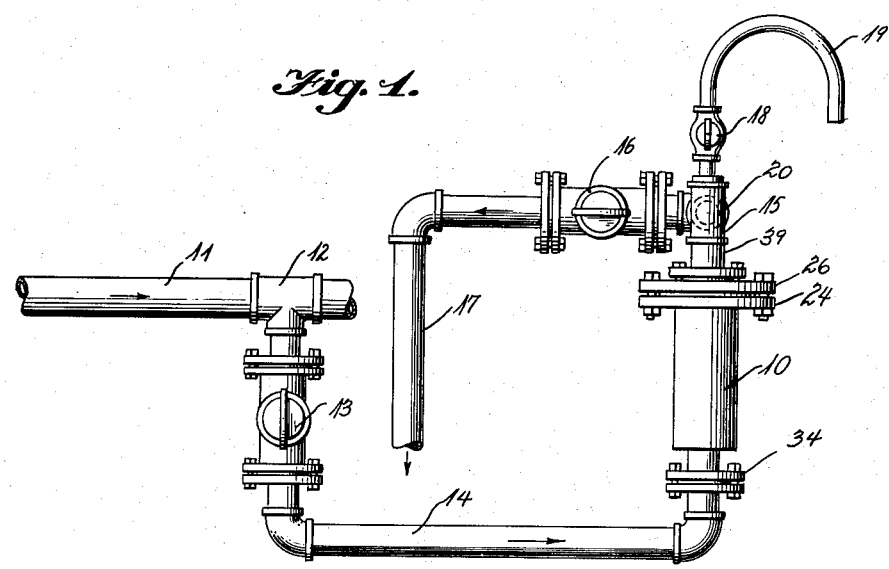
Figure 1 is a view in elevation of a portion of the piping system between a viscose aging vat and a spinneret showing a strainer assembly according to the present invention in a typical environment.

Referring now to the drawings in greater detail and more particularly Figures 1 to 4 inclusive, the numeral 10 designates generally the strainer assembly of the present invention. The viscose solution which has been aged and is ready for spinning is supplied through a supply pipe or manifold 11 and, at various points along the length of this manifold, there are T connections 12 through which the viscose solution is distributed to the various spinnerets with which the machine served by manifold 11 is equipped. Each T connection 12 can serve a whole machine or any part of a machine or even individual spinnerets. From the T connections 12 the viscose led to one or more spinnerets passes through a valve 13 and a conduit 14 into one end of the strainer assembly 10. After passing through the strainer it flows into another T connection 15 and from there through a valve 16 to a conduit 17 leading to the spinning pumps and spinnerets (not shown). The branch of the T connection 15 which does not lead to the valve 16 leads to a smaller valve 18 connected to an air vent line 19 which can be connected to any suitable type of drainage system.

It will be understood that the foregoing description is for the purpose of establishing the position of use and general environment of the strainer assembly 10. The uses to which the various valves 13, 16 and 18 may be put are so apparent as scarcely to require discussion. In the event of the necessity for repairs to the strainer assembly 10 the viscose supply can be shut off by valve 13. If it is suspected that entrapped gas is in the line this is released through the valve 18 which is opened while valve 16 is closed. In various assemblies it may be that the valve arrangement and piping between the supply source for viscose and the spinneret will be different from that illustrated in Figure 1, but it will be apparent that the strainer assembly 10 is of equal utility regardless of the type of piping arrangement employed.

Figure 2:
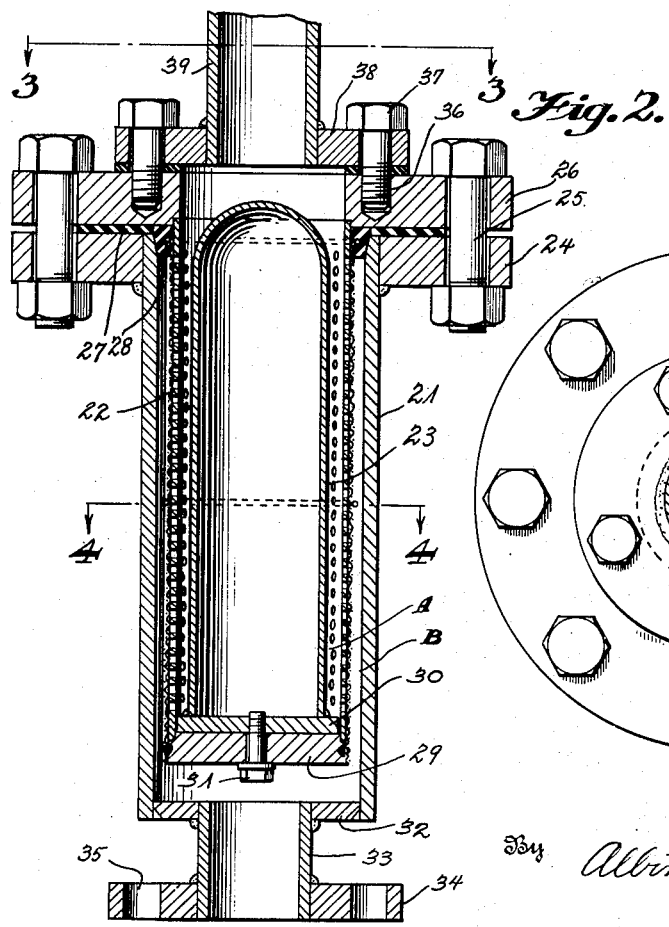
Figure 2 is a view in vertical section and to a larger scale of the strainer assembly of Figure 1.
Figure 3:
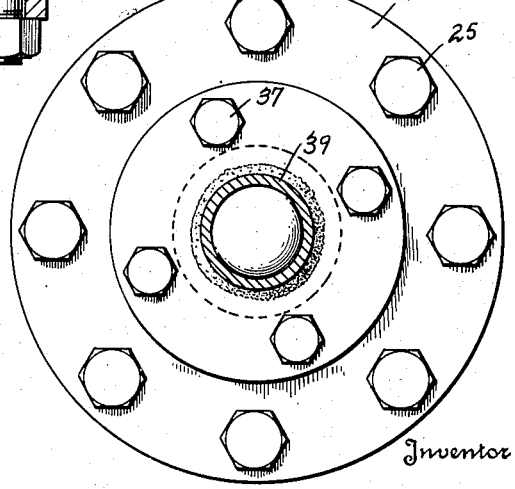
Figure 3 is a view partially in plan and partially in section taken on the line 3—3 of Figure 2.

If now specific reference is made to Figures 2, 3 and 4 it will be noted that the assembly 10 is comprised of a chamber 21, a generally cylindrical perforate strainer screen 22, and a hollow imperforate body 23 located within the strainer. The chamber 21 is provided at its upper end with an annular flange 24 and this flange, by means of bolts 25, is attached to a flange 26 which extends from and supports the strainer 22. Between the flanges 24 and 26 there is interposed an annular gasket 27 and a thicker, radially smaller sealing gasket 28.

The strainer 22, at its end remote from the flange 26, is attached to a disc 29 which in turn is attached to a disc 30 by a bolt 31. Supported on the disc 30 and attached thereto as by welding is the hollow imperforate plug-like body 23 which is co-extensive with the screen 22 and which terminates adjacent the upper end of the screen 22 in a rounded dome-like end.

The chamber 21, the screen 22 and the plug-like body 23 are all elongate and all lie on the same axis. Thus it is that an annular space A is provided between the body 23 and the screen 22 while another annular space B is provided between the screen and the inner surface of the chamber 21. See in this regard both of Figures 2 and 4.

The lower end of the chamber 21 is provided with an annular end closure 32 having a central outlet pipe 33 welded or otherwise attached thereto. The pipe 33 is provided with a flange 34 having bolt holes 35 so that it may be conveniently attached to a similar flange on the end of the pipe 14 so as to permit installation of the strainer assembly 10 in the system.

The flange 26 is tapped at several places 36 to receive bolts 37 of a flange 38 on the pipe 39 which leads to the valve 20, so that the other end of the strainer assembly 10 may be attached in the system.

It is noted that the cross sectional area of the pipes or conduits 33 and 39 is the same while the cross sectional area of the chamber 21 is considerably greater than either of them. However, the sum of the cross sectional area of spaces A and B taken in a plane normal to the long axis of the assembly is substantially equal to the cross sectional area of the conduits 33 and 39. Consequently the chamber 21, although capable of accommodating the large screen 22, does not produce quiescent spots or zones of reduced flow velocity in the viscose stream.

By varying the diameter of the plug 23 it is of course possible to modify the flow characteristics of the strainer assembly to produce whatever results are desired. In view of the fact that ripened viscose is subject to very rapid congelation in a quiescent condition, the apparatus of the present invention when used in a viscose supply line is required to have the plug of such cross sectional dimensions that the sum of the cross sectional area of the spaces A and B is equal to or less than the cross section of the conduits 33 and 39. On the other hand the invention is of wide general utility and should a slight reduction in flow rate be desirable in some installations it can be accomplished by reducing the cross section of the plug 23 relative to the cross section of the chamber 21. Note that the feature which brings about the results discussed above is the fact that the plug is axially co-extensive with the screen so that the flow characteristics of the strainer as a whole are maintained throughout its length even though the area of the screen may be quite extensive as compared to the cross section of the conduits leading to and from it.

While the foregoing description affords an adequate understanding of the invention, it is apparent that numerous modifications are possible. The chamber need not be in the form of a right cylinder and, as an example of satisfactory modification, there is shown in Figure 5 a chamber 40 which is dome-shaped. In this case the chamber is supplied from a conduit 41 and the material is withdrawn through a conduit 42. The base of the chamber 40 is provided with an annular flange 43 and this flange is connected by bolts 44 to a radial flange 45 extending from the pipe 41. Within the chamber 40 there is disposed a right cylindrical hollow screen 46 anchored to the inner wall of the chamber 40 at 47. The end of the screen 46 remote from the anchorage point is provided with a disc 48 to which is attached a centrally located plug 49 which is externally geometrically similar to the internal surface of the chamber 40. For this reason the cross section of the strainer assembly of Figure 5 at about the midpoint of the plug would appear very similar to the cross section illustrated in Figure 4. Here again the total cross section of the working space between the outer surface of the plug 49 and the inner surface of the chamber 40 is equal to or less than the cross section of the conduits 41 and 42. Figure 5 is of value in demonstrating the theory of operation of the present invention since it indicates that the important feature of the invention is the geometrical similarity of the outer surface of the plug and the inner surface of the chamber rather than the exact relationship of the screen to either of them.

In Figure 6 there is illustrated a form of the invention in which the cross section of the chamber corresponds in shape to a six-pointed star. Here the chamber bears reference numeral 50 while the plug bears reference numeral 51. Note again that the external surface of the plug is geometrically similar to the internal surface of the chamber. The screen which bears reference numeral 52 is also of star shape in cross section and is interposed in the space between the plug and the inner walls of the chamber.

It is apparent that various other modifications of this invention may be made but it is believed that the foregoing will afford sufficient examples to instruct those skilled in the art the manner in which the invention is to be practiced.

What is claimed is:

1. A strainer assembly for viscose spinning solution comprising an elongated chamber; an inlet conduit leading into said chamber; an outlet conduit leading from said chamber; the cross sectional area of said chamber throughout its length being greater than the cross sectional area of either of said conduits; an imperforate body in said chamber; said body being smaller than the space defined by the inner surface of said chamber and having walls parallel to and equally spaced from the inner walls of said chamber, and, having its long axis coincident with the long axis of the chamber space, the walls of said imperforate body being smooth and unbroken in the direction of flow of viscose; the cross sectional area of the space defined between said body and the inner surface of said chamber being not greater than the cross sectional area of either of said conduits; an elongated hollow screen interposed in spaced relation to and between said body and the inner surface of said chamber, a bottom for said screen, said imperforate body being unsupported at one end and being connected to said bottom at the other end.

2. A strainer assembly for viscose spinning solution comprising an elongated chamber; a first conduit connected to the bottom of said chamber; a second conduit connected to the top of said chamber; the cross sectional area of said chamber throughout its length being greater than the cross sectional area of either of said conduits; an imperforate body in said chamber; said body being smaller than the space defined by the inner surface of said chamber and having walls parallel to and equally spaced from the inner walls of said chamber and, having its long axis coincident with the long axis of the chamber space the walls of said imperforate body being smooth and unbroken in the direction of flow of viscose; the cross sectional area of the space defined between said body and the inner surface of said chamber being not greater than the cross sectional area of either of said conduits; an elongate hollow screen interposed in spaced relation parallel to and between said body and the inner surface of said chamber a bottom for said screen, said imperforate body being unsupported at its upper end and being connected to said bottom at its lower end.

3. A strainer assembly for viscose spinning solution comprising an elongate hollow chamber having a larger diameter at one end than at the other end, an inlet conduit leading into one end of said chamber, an outlet conduit leading from the other end of said chamber, the cross sectional area of said chamber being greater than the cross sectional area of either of said conduits, an imperforate body in said chamber arranged with its long axis coincident with the long axis of said chamber, said imperforate body having walls parallel to and equally spaced from the inner walls of said chamber throughout the length of said chamber, the walls of said imperforate body being smooth and unbroken in the direction of flow of viscose, the area of the annulus defined between the inner surface of said chamber and the outer surface of said body being not greater than the cross sectional area of said conduits, an elongated hollow screen arranged in said annular space between said chamber and body, a bottom for said screen, said imperforate body being unsupported at its upper end and being connected to said bottom at its lower end.

4. A strainer assembly for viscose spinning solution comprising an elongate hollow chamber having a larger diameter at one end than at the other end, a first conduit connected to the bottom of said chamber, a second conduit connected to the top of said chamber, the cross sectional area of said chamber being greater than the cross sectional area of either of said conduits, an imperforate body in said chamber arranged with its long axis coincident with the long axis of said chamber, said imperforate body having walls parallel to and equally spaced from the inner surface of said chamber throughout the length of said chamber, the walls of said imperforate body being smooth and unbroken in the direction of flow of viscose, the area of the annulus defined between the inner surface of said chamber and the outer surface of said body being not greater than the cross sectional area of said conduits, an elongated hollow screen arranged in said annular space between said chamber and said body, a bottom for said screen, said imperforate body being unsupported at its upper end and being connected to said bottom at its lower end.

MILTON A. SULLIVAN.

References Cited in the file of this patent

UNITED STATES PATENTS

| Number | Name | Date |
|---|---|---|
| Re. 18,114 | Lundborg | June 30, 1931 |
| 1,976,547 | Dumas | Oct. 9, 1934 |
| 2,352,130 | Short et al. | June 20, 1944 |
| 2,360,020 | Skinner | Oct. 10, 1944 |
| 2,362,530 | Bennett | Nov. 14, 1944 |

FOREIGN PATENTS

| Number | Country | Date |
|---|---|---|
| 158,497 | Great Britain | Feb. 10, 1921 |
| 376,574 | Great Britain | July 19, 1932 |